(12) United States Patent
Profitt-Brown et al.

US008849499B2

(10) Patent No.: US 8,849,499 B2
(45) Date of Patent: Sep. 30, 2014

(54) METHODS AND SYSTEMS FOR MONITORING A VEHICLE'S ENERGY SOURCE

(75) Inventors: Elizabeth Profitt-Brown, Plymouth, MI (US); Joseph Paul Rork, Canton, MI (US); Brian Petersen, Ferndale, MI (US); Edward Andrew Pleet, Livonia, MI (US); Kelly Lee Zechel, Plymouth, MI (US); Yevgeniya Sosonkina, Birmingham, MI (US); Susan Curry, Allen Park, MI (US); Mary Smith, Canton, MI (US); Ryan Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 684 days.

(21) Appl. No.: 12/985,803

(22) Filed: Jan. 6, 2011

(65) Prior Publication Data

US 2011/0224841 A1    Sep. 15, 2011

(51) Int. Cl.
| | | |
|---|---|---|
| *B60R 25/10* | (2013.01) | |
| *B60L 11/18* | (2006.01) | |
| *B60K 35/00* | (2006.01) | |
| *G07C 5/00* | (2006.01) | |

(52) U.S. Cl.
CPC ............ *B60L 11/1809* (2013.01); *Y02T 90/128* (2013.01); *Y02T 10/7044* (2013.01); *Y02T 10/7088* (2013.01); *B60L 11/1838* (2013.01); *B60L 2230/40* (2013.01); *B60K 35/00* (2013.01); *B60K 2350/357* (2013.01); *Y02T 10/7005* (2013.01); *Y04S 30/14* (2013.01); *B60K 2350/1092* (2013.01); *G07C 5/008* (2013.01); *Y02T 90/168* (2013.01); *Y02T 90/169* (2013.01); *Y02T 90/14* (2013.01); *B60L 11/1861* (2013.01); *Y02T 10/705* (2013.01); *Y04S 30/12* (2013.01); *Y02T 90/163* (2013.01); *B60W 2510/244* (2013.01)
USPC ...................... 701/31.4; 340/426.18; 380/270

(58) Field of Classification Search
USPC ...................... 701/31.4; 340/426.18; 380/270
See application file for complete search history.

(56) References Cited

U.S. PATENT DOCUMENTS

| | | |
|---|---|---|
| 5,202,617 A | 4/1993 | Nor |
| 5,301,113 A | 4/1994 | To et al. |

(Continued)

FOREIGN PATENT DOCUMENTS

| | | |
|---|---|---|
| EP | 2102598 | 1/2013 |
| WO | 2009071364 A1 | 6/2009 |

(Continued)

OTHER PUBLICATIONS

News Release, Chevrolet and OnStar Give Volt Owners 24/7 Connection and Control via Wireless Smartphone Application, released Jan. 5, 2010.*

(Continued)

*Primary Examiner* — Adam Tissot
(74) *Attorney, Agent, or Firm* — Jennifer M. Stec; Brooks Kushman P.C.

(57) ABSTRACT

One or more embodiments may include a method for remotely obtaining information about an energy source of a vehicle. Information identifying one or more vehicles and one or more drivers of the vehicles may be received at one or more computing devices remote from a vehicle. Instructions from the one or more remote computing devices may be transmitted requesting information from the identified vehicle(s) about a status of an energy source for the identified vehicle(s). The status information may be received at the remote computing device(s). Based on the energy source status information and the driver identifying information, a vehicle energy source status with respect to one or more attributes of the vehicle drivers may be calculated. Additionally, the vehicle energy source status may be displayed at the one or more devices.

14 Claims, 5 Drawing Sheets

(56) References Cited

U.S. PATENT DOCUMENTS

| | | | |
|---|---|---|---|
| 5,539,399 A | 7/1996 | Takahira et al. | |
| 5,686,895 A | 11/1997 | Nakai et al. | |
| 5,790,976 A | 8/1998 | Boll et al. | |
| 5,892,346 A | 4/1999 | Moroto et al. | |
| 5,913,917 A | 6/1999 | Murphy | |
| 5,916,298 A | 6/1999 | Kroiss et al. | |
| 6,198,995 B1 | 3/2001 | Settles et al. | |
| 6,337,621 B1 | 1/2002 | Ogino et al. | |
| 6,591,185 B1 | 7/2003 | Polidi et al. | |
| 6,836,728 B2 | 12/2004 | Shimabara | |
| 6,864,807 B2 | 3/2005 | Todoriki et al. | |
| 6,947,732 B2 | 9/2005 | Fraser | |
| 7,127,350 B2 | 10/2006 | Oikubo | |
| 7,142,664 B2 | 11/2006 | Seligmann | |
| 7,149,623 B2 | 12/2006 | Flick | |
| 7,277,780 B2 | 10/2007 | Meier-Arendt et al. | |
| 7,346,630 B2 | 3/2008 | Eichstaedt et al. | |
| 7,402,978 B2 | 7/2008 | Pryor | |
| 7,433,714 B2 | 10/2008 | Howard et al. | |
| 7,444,384 B2 | 10/2008 | Horvitz | |
| 7,586,956 B1 | 9/2009 | Mishra et al. | |
| 7,668,644 B2 | 2/2010 | Tengler et al. | |
| 7,873,466 B2 | 1/2011 | Kong | |
| 7,925,426 B2 | 4/2011 | Koebler et al. | |
| 8,000,842 B2 | 8/2011 | Yi et al. | |
| 8,005,453 B2 | 8/2011 | Van Bosch et al. | |
| 8,103,434 B2 | 1/2012 | Helbing et al. | |
| 8,239,127 B2 | 8/2012 | Kono et al. | |
| 8,255,152 B2 | 8/2012 | Barth et al. | |
| 8,284,039 B2 | 10/2012 | Baker et al. | |
| 8,290,695 B2 | 10/2012 | Hiestermann et al. | |
| 8,290,701 B2 | 10/2012 | Mason et al. | |
| 8,294,286 B2 | 10/2012 | Hunter | |
| 8,401,792 B2 | 3/2013 | Yeh et al. | |
| 8,478,642 B2 | 7/2013 | Dey et al. | |
| 8,504,236 B2 | 8/2013 | Guo et al. | |
| 2002/0164998 A1 | 11/2002 | Younis | |
| 2003/0023374 A1 | 1/2003 | Shimabara | |
| 2004/0073643 A1 | 4/2004 | Hayes et al. | |
| 2004/0162669 A1 | 8/2004 | Nagamasa | |
| 2004/0243307 A1 | 12/2004 | Geelen | |
| 2005/0080552 A1 | 4/2005 | Feldman et al. | |
| 2006/0002413 A1 | 1/2006 | Tsutazawa et al. | |
| 2006/0007022 A1 | 1/2006 | Endo et al. | |
| 2006/0290490 A1 | 12/2006 | Kraus et al. | |
| 2007/0052552 A1 | 3/2007 | Suzuki | |
| 2007/0112475 A1 | 5/2007 | Koebler et al. | |
| 2007/0150171 A1 | 6/2007 | Tengler et al. | |
| 2007/0271035 A1 | 11/2007 | Stoschek et al. | |
| 2008/0027606 A1 | 1/2008 | Helm | |
| 2008/0042489 A1 | 2/2008 | Lewis et al. | |
| 2009/0021218 A1 | 1/2009 | Kelty et al. | |
| 2009/0099992 A1 | 4/2009 | Horvitz | |
| 2009/0110163 A1 | 4/2009 | Gupta | |
| 2009/0119385 A1 | 5/2009 | Horvitz | |
| 2009/0138188 A1 | 5/2009 | Kores et al. | |
| 2009/0141173 A1 | 6/2009 | Pugel | |
| 2009/0265099 A1 | 10/2009 | Gottlieb | |
| 2009/0309709 A1* | 12/2009 | Bevacqua et al. | 340/426.18 |
| 2010/0017249 A1 | 1/2010 | Fincham et al. | |
| 2010/0060016 A1 | 3/2010 | Hunter | |
| 2010/0070253 A1 | 3/2010 | Hirata et al. | |
| 2010/0076675 A1 | 3/2010 | Barth et al. | |
| 2010/0094496 A1 | 4/2010 | Hershkovitz et al. | |
| 2010/0106514 A1 | 4/2010 | Cox | |
| 2010/0106603 A1 | 4/2010 | Dey et al. | |
| 2010/0110077 A1 | 5/2010 | Grossman et al. | |
| 2010/0131188 A1 | 5/2010 | Yeh et al. | |
| 2010/0138142 A1 | 6/2010 | Pease | |
| 2010/0169008 A1 | 7/2010 | Niwa et al. | |
| 2010/0207772 A1 | 8/2010 | Yamamoto | |
| 2010/0235076 A1 | 9/2010 | Ofek et al. | |
| 2010/0237985 A1 | 9/2010 | Landau-Holdsworth et al. | |
| 2010/0256830 A1 | 10/2010 | Kressner et al. | |
| 2010/0274689 A1 | 10/2010 | Hammad et al. | |
| 2010/0286909 A1 | 11/2010 | Tate, Jr. et al. | |
| 2011/0040438 A1 | 2/2011 | Kluge et al. | |
| 2011/0060495 A1 | 3/2011 | Kono et al. | |
| 2011/0060517 A1 | 3/2011 | Kono et al. | |
| 2011/0191265 A1 | 8/2011 | Lowenthal et al. | |
| 2011/0225105 A1 | 9/2011 | Scholer et al. | |
| 2011/0238457 A1 | 9/2011 | Mason et al. | |
| 2011/0251789 A1 | 10/2011 | Sanders et al. | |
| 2011/0307166 A1 | 12/2011 | Hiestermann et al. | |
| 2011/0309926 A1 | 12/2011 | Eikelenberg et al. | |
| 2012/0016551 A1 | 1/2012 | Krause et al. | |
| 2012/0016576 A1 | 1/2012 | Huang et al. | |
| 2012/0022904 A1 | 1/2012 | Mason et al. | |
| 2012/0029800 A1 | 2/2012 | Kluge et al. | |
| 2012/0065831 A1 | 3/2012 | Ross et al. | |
| 2012/0158299 A1 | 6/2012 | Cerecke et al. | |
| 2012/0179315 A1 | 7/2012 | Tate et al. | |
| 2012/0179362 A1 | 7/2012 | Stille | |
| 2012/0232783 A1 | 9/2012 | Calkins et al. | |
| 2012/0271542 A1 | 10/2012 | Arcot et al. | |

FOREIGN PATENT DOCUMENTS

| | | |
|---|---|---|
| WO | 2009071369 A1 | 6/2009 |
| WO | 2011003813 | 1/2011 |
| WO | 2011021776 A2 | 2/2011 |
| WO | 2011035427 A1 | 3/2011 |

OTHER PUBLICATIONS

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

News Release, "Chevrolet and OnStar Give Volt Owners 24/7 Connection and Control via Wireless Smartphone Application", released Jan. 5, 2010.

Josie Garthwaite, "GM's Volt to Launch With Cell Phone App for Remote Control", Jan. 6, 2010, printed from http:/gigaom.com/cleantech/gms-volt-to-launch-with-cell-phone-app-for-remote-control/, Dec. 30, 2010.

GM Onstar Mobile Demonstration Capability for Volt img. retrieved from: Hayes, JW, "GM OnStar App for Chevy Volt". Auto and Racing News, Jan. 6, 2010. <http://autoandracingnews.wordpress.com/2010/01/06/gm-onstar-app-for-chevy-volt/>.

BlackBerry Curve Series, BlackBerry Curve 9300/9330-Smartphones User Guide, Version: 6.0 (2011), pp. 144.

BlackBerry Curve Series, BlackBerry Curve 9300/9330-Smartphones User Guide, Version: 6.0 (2011).

* cited by examiner

METHODS AND SYSTEMS FOR MONITORING A VEHICLE'S ENERGY SOURCE

BACKGROUND

1. Technical Field

Various embodiments relate to remotely monitoring a battery charge of a vehicle. In some embodiments, the vehicle may be an electric vehicle. The battery charge may be monitored from a nomadic device and/or a personal computer.

2. Background Art

The electronics inside vehicles today are more advanced with, for example, computing systems that can communicate with remote systems, sometimes over the Internet. Various OEMs offer software applications that run on a remote device, such as a cellphone, for exchanging information between a remote device and a vehicle. These applications are available for both electric and non-electric vehicles.

For example, a mobile application for the CHEVROLET VOLT permits a user to, among other things, lock and unlock a vehicle, obtain information about the electric vehicle (such as charge), and receive notifications about the vehicle.

SUMMARY

One aspect includes a computer-implemented method for remotely obtaining information about an energy source of a vehicle. The method may include receiving, at one or more computing devices remote from a vehicle, information identifying one or more vehicles and one or more drivers of the one or more vehicles.

The method may further include transmitting instructions from the one or more remote computing devices requesting information from the one or more vehicles about a status of an energy source for the identified vehicle. The method additionally includes receiving the information at the one or more remote computing devices.

Based on the energy source status information and the information identifying the one or more drivers, a vehicle energy source status with respect to one or more attributes of the vehicle drivers may be calculated at the one or more remote computing devices. The vehicle energy source status may be displayed at the one or more devices.

In some embodiments, the method may further include receiving a vehicle charging schedule for automatic charging of the vehicle. The method may additionally include commanding vehicle charging from the one or more remote computing devices based on the vehicle charging schedule. Based on the commanding, one or more charging instructions may be transmitted to the vehicle.

Another aspect may include a system for controlling vehicle charging. The system may include one or more computing devices and one or more software applications stored on the one or more computing devices. The software application(s) may include instructions for receiving a charge status of a vehicle and based on the charge status, determining if a charging is needed.

Further instructions may include determining when the charging is needed if a charging is needed. Further instructions may include commanding vehicle charging based on when charging is needed. Additionally, based on the commanding, further instructions may include transmitting, via the one or more computing devices, one or more charging instructions to the vehicle.

Another aspect may include a system comprising at least one device configured to receive information identifying a vehicle and vehicle drivers. The at least one device may be further configured to receive information for determining the vehicle energy source status. Further, the at least one device may be configured to determine an energy source status with respect to a driver attribute based on the status information and the driver information. The at least one device may be further configured to display the vehicle energy source status.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Additionally, the disclosure and arrangement of the figures is non-limiting. Accordingly, the disclosure and arrangement of the figures may be modified or re-arranged to best fit a particular implementation of the various embodiments of the invention.

As will be described in one or more embodiments below, one or more devices remote from a vehicle and a data network connection may be used to remotely communicate and exchange information with a vehicle. In some embodiments, the vehicle may be an electric vehicle. While the various embodiments are described with respect to the use of a battery energy source for the vehicle, other energy storage devices and systems (e.g., and without limitation, fuel, flywheels, supercapacitors, and other like rechargeable energy storage systems) may alternatively or additionally be used without departing from the scope of the invention. The remote device(s) may be in a home, office, school, library, or other like remote location. Typically, the remote location may also provide charging capabilities for an electric vehicle. The remote location may or may not be in the same location as the remote device(s). Further, the remote location may additionally be connected to a network, such as the Internet, a local area network (LAN), wide area network (WAN), and the like.

Figure 1:
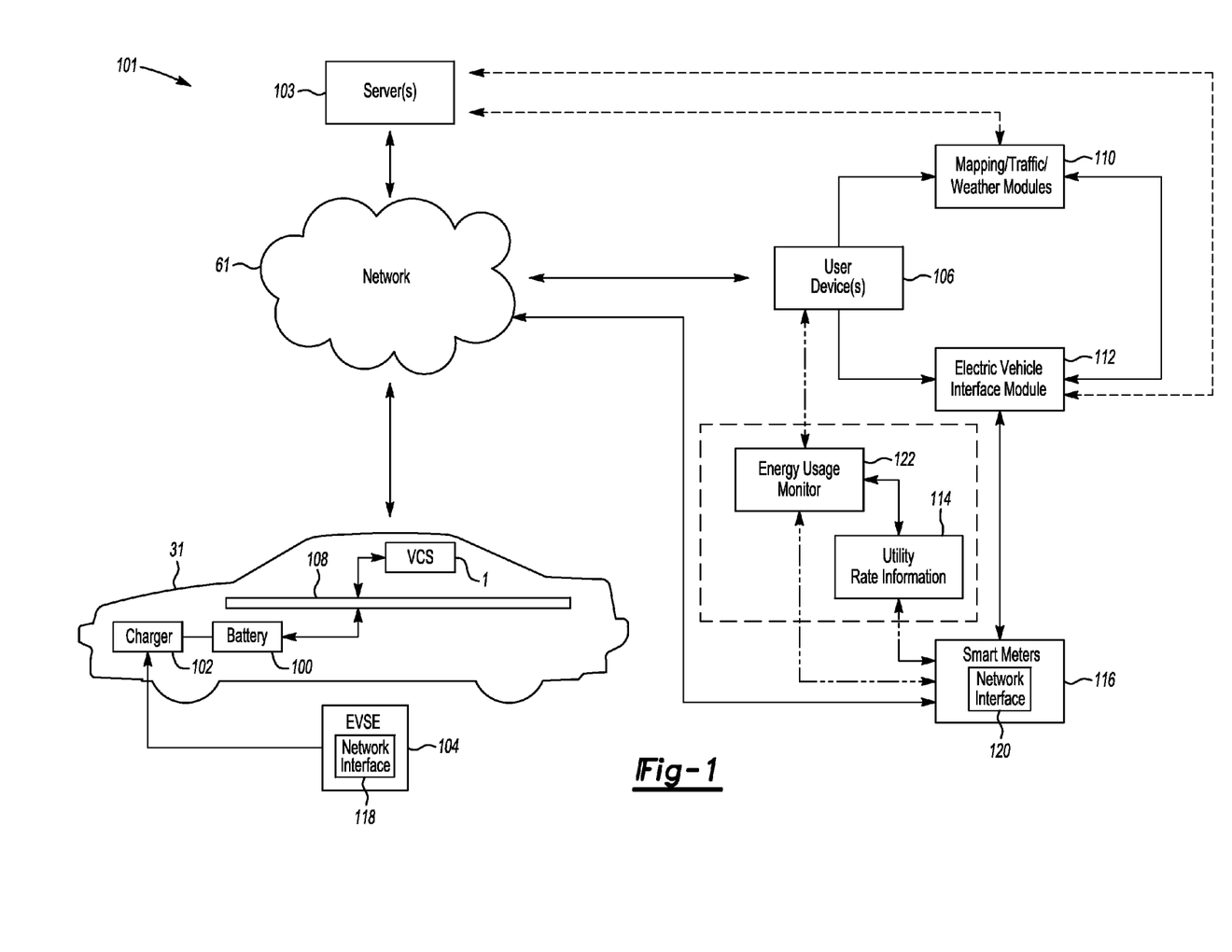
FIG. 1 illustrates a block topology of a system for remote communication and information exchange with a vehicle.

FIG. 1 illustrates a block architecture of a system 101 for remote communication and information exchange with an electric vehicle. The arrangement and configuration of FIG. 1 may be modified without departing from the scope of the invention such that the various components may be on board the vehicle or both on board and off board the vehicle.

A plug-in electric vehicle (PEV) 31 may be outfitted with one or more electric battery packs 100 for providing power to the PEV vehicle 31. The battery pack(s) 100 may include one or more chargers 102 for capacitive or inductive charging of the battery pack(s) 100. In some embodiments, the battery pack(s) 100 may not include the charger 102.

Electric vehicle (EV) supply equipment (EVSE) 104 may be used to charge the vehicle 31. Charging may be accomplished using the EV supply equipment 104 by plugging in to the battery pack(s) 100 according to methods known in the art. The EV supply equipment 104 may include a transceiver (e.g., a network interface) 118 for receiving and transmitting data exchanged with the user terminal(s) 106. Further details of this data exchange will be described below.

From one or more user devices 106, which may be at a remote location including, but not limited to, a home, an office, a library, a school, and other like remote locations, a user may exchange information with the vehicle 31. The user device(s) 106 may be one or more personal computers or one or more nomadic devices (including, but not limited to, mobile phones, PDAs, personal media players, and the like).

The user device(s) 106 connection to the network 61 for communication with the vehicle infotainment computer (VCS) 1 may include, but is not limited to, WiFi, WiMax, dial-up, cable modem, DSL, ZigBee and other like wired and wireless connections. Other like network connections may be used without departing from the scope of the invention. Accordingly, the user device(s) 106 may exchange information with the vehicle 31 over a communication network 61 through a wired or wireless connection. A network 61 may be, without limitation, the Internet, a local area network (LAN), a wide area network (WAN), powerline carrier communication (PLC), broadband over power line (BPL) or combinations of such networks. Other like networks may be used without departing from the scope of the invention.

As will be described below, the user device 106 may be configured with one or more software application(s) having graphical interface. In some embodiments, operation of the application(s) may occur using one or more audible commands. In alternative or additional embodiments, the operation may occur with tactile commands.

The vehicle 31 may be outfitted with an on-board communication unit for data exchange with the user device 106. The on-board communication unit may include a nomadic device (e.g., without limitation, a cellular phone) which may be used to transmit and receive communications through a cellular network (not shown). These communications may be relayed through network 61. In some embodiments, the on-board communication unit 1 may additionally or alternatively include a modem (not shown) for communication over network 61. As shown in FIG. 1, in some non-limiting embodiments, the on-board communications unit may be a vehicle infotainment computer (VCS) 1. An example of such a VCS 1 is the SYNC system manufactured by THE FORD MOTOR COMPANY. Further details of the VCS 1 will be described below with respect to FIG. 2.

The on-board communications unit (OCU) 1 may be in communication with a vehicle network 108 that communicates data to various vehicle control modules. Non-limiting examples of a vehicle network 108 include an SAE J1850 bus, a CAN bus, a GMLAN bus, and any other vehicle data buses known in the art. As shown in FIG. 1, the one or more battery packs 100 may be connected to the vehicle network 108. Other vehicle modules not shown (e.g., powertrain control modules, airbag control modules, and the like) may also be connected to the network 108. One non-limiting example of information exchanged between the vehicle 31 and the user device(s) 106 may be information about the battery charge. This information may be received by the OCU 1 from the battery 100 via the vehicle network 108.

Referring back to the user device(s) 106, the device 106 may be configured with one or more software modules for information exchange with the EV 31. One non-limiting example of such information exchange may relate to a battery charge. Each of these modules may be implemented on the user device(s) 106 as software. In some embodiments, the modules may be on a remote server (not shown) which may or may not be a third-party server. An application programming interface (API) for interfacing with the modules may or may not be installed on the user device(s) 106. While FIG. 1 illustrates the modules as separate components for illustration, the various embodiments are not limited to this configuration. As a non-limiting example, the modules may comprise a single software application executing on the user device(s) 106 or on a remote server. In some embodiments, some modules may be executing locally (e.g., on the user device(s) 106) and others on a remote server.

Referring to the specific modules, one or more modules 110 may provide mapping/navigation information, traffic information, and/or weather information. This information may be stored in one or more mapping/traffic/weather databases (not shown) and used by the electric vehicle interface module 112 to exchange trip information with the vehicle 31. In some embodiments, this information may be obtained from a third-party source (e.g., a mapping service, traffic service and/or a weather service) (not shown). This information exchange may occur via data communication including, but not limited to, data-over-voice, the Internet, and the like.

In some embodiments, the module 110 may be also be a trip planning module or may communicate with a trip planning module (not shown). The algorithms implemented on the trip planning module may factor conditions such as (and without limitation) traffic, road conditions (e.g., and without limitation, uphill/downhill, dirt, etc.), road type (e.g., city or highway), and weather in order to provide the trip determination. Other non-limiting factors may include environment friendly travel and lowering carbon cost (e.g., carbon footprint). For example, and without limitation, the determination may include accounting for inclement weather (which may cause the vehicle to use more battery power).

The electric vehicle interface module 112 may be a user-interfacing application for information exchange between the user device(s) 106 and the vehicle 31. As a non-limiting example, the module 112 may receive and monitor a battery charge status. As another non-limiting example, the module 112 may exchange trip information with the vehicle 31.

The module 112 may communicate (via the user device 106) with one or more smart meters 116 from which battery charge information may be obtained. A smart meter 116 may be a device implemented by a utility company that can measure energy consumption by a commercial or residential establishment over a communications network. The smart meters 116 may obtain the charge status from the EV supply equipment 104 by exchanging information with the supply equipment 104. Accordingly, the smart meters 116 may include a network interface 120 for communicating with the EVSE 104. In some embodiments, sub-meters (not shown) may additionally be used for energy usage monitoring.

Battery charge status information may be additionally or alternatively received from the battery 102 via the OCU 1. In this non-limiting embodiment, the OCU 1 may be programmed with logic for translating or converting the battery charge information received via the vehicle network 108 to information capable of being processed and interpreted by the module 112. For example, and without limitation, a look up table stored on the OCU 1 may be used for performing this conversion. Alternatively or additionally, at least part of the conversion/translation may be performed on the user device 106 (e.g., and without limitation, by the module 112).

An energy usage monitoring module 122 may monitor and report the energy usage of one or more appliances within the remote location (e.g., a home or office), including the EVSE 104. The energy usage monitor 122 may obtain usage information from the smart meter 116, the appliances (not shown), or both. These one or more appliances may be connected on a local area network (LAN). In some embodiments, the LAN may be a home area network (HAN). One example of such a module 122 is the MICROSOFT HOHM application from the MICROSOFT CORPORATION.

In some embodiments, the energy usage by some or all appliances at the remote location may be factored into the charge status of the battery. Accordingly, a user may unplug some appliances if a faster charge is desired by the user. In some embodiments, a user may additionally or alternatively defer usage of some devices. The deferment may or may not be automatically programmed from the user device(s) 106. As a non-limiting example, the user may schedule usage of other appliances based on a battery charge time.

System 114 may be a utility data information system operated by and housed at one or more utility companies. The utility data may be determined by a utility company based on information obtained from one or more utility grids owned and operated by the utility company. The utility data may be stored utility data (e.g., and without limitation, in a database) in the system 114 and received by the module 122 from the system 114 via, for example, a communication network (e.g., and without limitation, PLC, BPL, and the like). In some embodiments, the data may be received via the smart meters 116.

Figure 2:
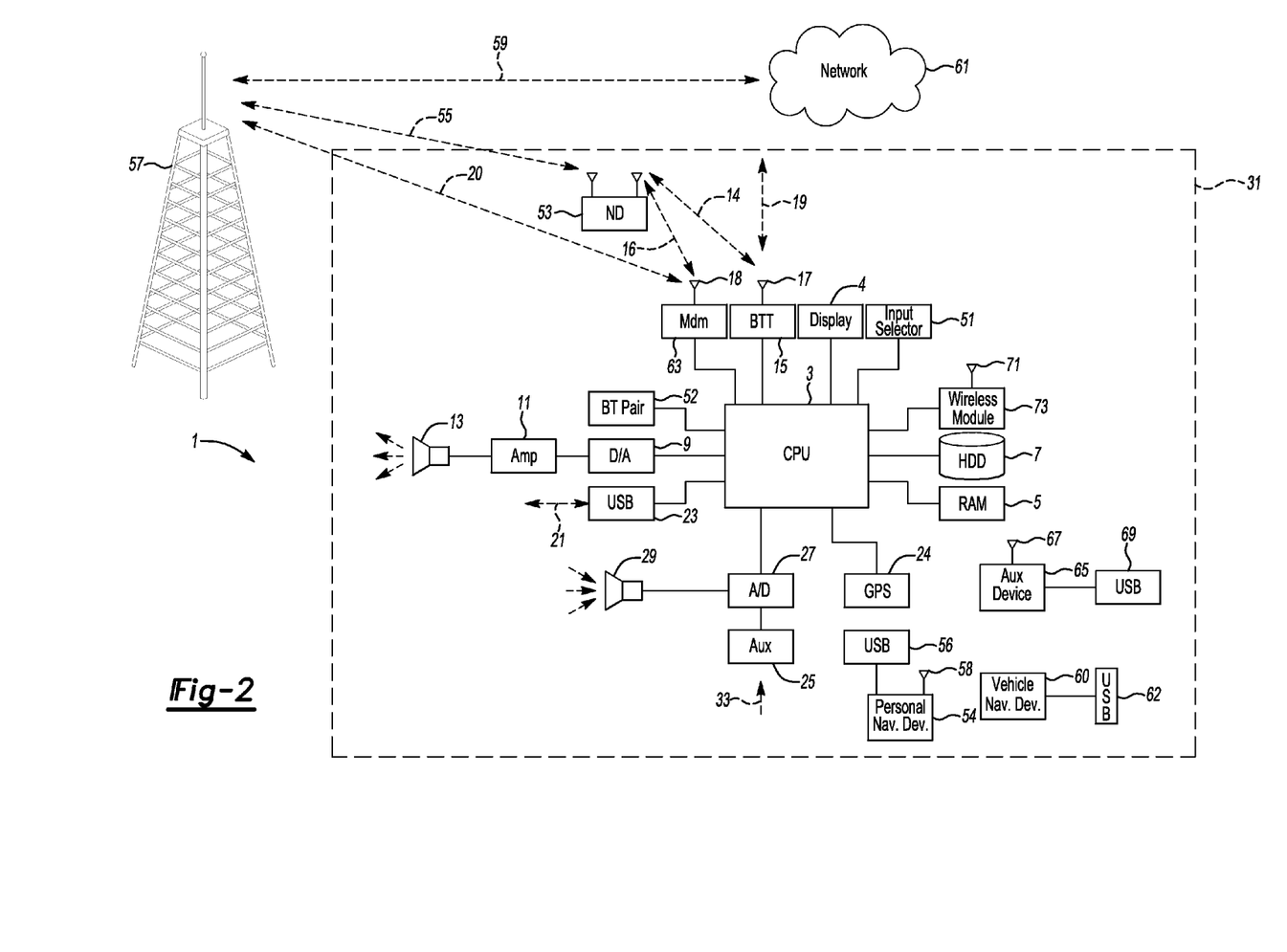
FIG. 2 illustrates a block topology of a vehicle computing system.

FIG. 2 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

Figure 3:
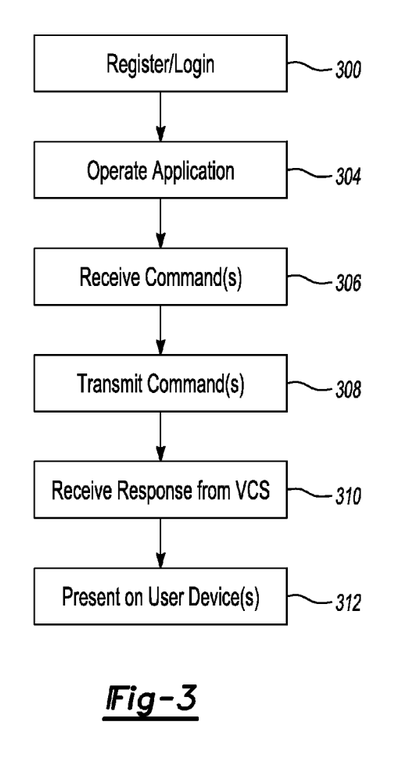
FIG. 3 illustrates an operation at a remote device for monitoring a vehicle's charge.

FIG. 3 illustrates the process that may occur at the user device(s) 106 for monitoring the vehicle charge of vehicle 31. From a user device 106, a user, who may be a vehicle owner(s) or an individual authorized by the vehicle owner(s) (e.g., and without limitation, a dealer, service technician, a family member, a colleague, or the like) may register in order to be identified and authenticated for use of the system 101 (block 300). Registration may be performed using, for example, an Internet connection.

In some embodiments, the vehicle owner(s) may register and establish authorized users during the registration process. In this case, identification information may be provided for the authorized user(s) including, but not limited to, a name, mobile identification number (e.g., a phone number), and an electronic serial number (ESN). This information, along with information about the vehicle owner, may be stored in a database of user information (not shown). In some embodiments, an override feature for user identification may permit a non-vehicle owner use of the system 101 without authorization from the vehicle user.

If a vehicle owner(s) is registered, the owner(s) may alternatively log in for system use (block 300). In some embodiments, the log in information may be stored in memory obviating a need for a user to input log-in information.

The application 112 may be operated after the application is started (block 304). The application may be started in response to a user input command (e.g., tactile and/or verbal). In some embodiments, the application may be started after registration and/or login.

One or more instructions for vehicle information may be commanded from the application 112 (block 306). The instruction(s) may be verbal and/or tactile commands based on instructions presented to the user at the user device(s) 106. The instructions may be presented on a display (e.g., in the form of menus, icons, links, etc.) and/or presented in a spoken language. Alternatively or additionally, the instruction(s) may be triggered automatically by the application 112 at predetermined time intervals (e.g., based on minutes, hours, days, or combinations and/or variations thereof).

Non-limiting examples of such instructions may include obtaining information about vehicle battery charge (including, but not limited to, a battery charging status, battery charge life, and information on scheduled charges), scheduling charge times, starting a vehicle charge, obtaining vehicle analytics (including, but not limited to, analytics relating to battery charge, driving, financial cost savings, and environmental cost savings), obtaining maintenance information (e.g., maintenance needed or next scheduled maintenance), obtaining information on the condition of the vehicle (e.g., odometer reading, tire pressure, battery performance, battery health, and the like), and obtaining charge station information.

In some embodiments, the application 112 may also enable remote control of vehicle components including, but not limited to, vehicle start, door lock and unlock, radio control, HVAC control (e.g., and without limitation, preconditioning the vehicle using power from a utility grid rather than the battery), window control, and the like. Additional details and non-limiting examples of the vehicle command(s) are described below with respect to FIG. 4.

In some instances, remotely controlling one or more vehicle controls may optimize the use of a vehicle's charge by, for example, enabling greater distance range. As a non-limiting example, preconditioning the vehicle while the vehicle is charging (e.g., pre-heating and/or pre-cooling the vehicle) may use energy from the energy grid rather than the vehicle battery. Accordingly, more battery charge may be available for driving.

The instruction(s) may be transmitted from the user device(s) 106 to the VCS 1 in the vehicle 31 via network 61. In some embodiments, the instruction(s) may be transmitted via a centralized system (not shown in FIG. 1) communicating with the VCS 1 and the user device(s) 106. In some embodiments, the centralized system may be one or more servers. The server system may include processing capability for incoming signals from the user device(s) 106 designated to interact with the vehicle 31.

For example, the server(s) 101 may include an automated call server and/or web host. Further, the server(s) 101 may route an incoming signal from the user device(s) 106 to the appropriate remote vehicle. Data sent in this fashion may be sent using data-over-voice, a data-plan, or in any other suitable format. Once the server(s) receive the incoming data request from the user device(s) 106, the message may be processed and/or relayed to the vehicle 31. The vehicle 31 may be identified by a header associated with one or more incoming data packets, or may be identifiable based on a database lookup, for example. The relay to the vehicle 31 may be sent out from the server(s) through a network (e.g., without limitation, a cellular network, the internet, etc.) and to the vehicle 31.

A response may be received at the user device(s) 106 from the VCS 1 for the one or more instruction(s) (block 310). The response may be based on information obtained from the vehicle modules and received by the VCS 1 via the vehicle network 108. The path followed by the response to the user device(s) 106 may be a reverse path of the data path described above.

The response to the instruction(s) may be presented at the user device(s) 106. As a non-limiting example, the status of a vehicle battery charge may be output in response to a request for the battery charge status.

Figure 4:
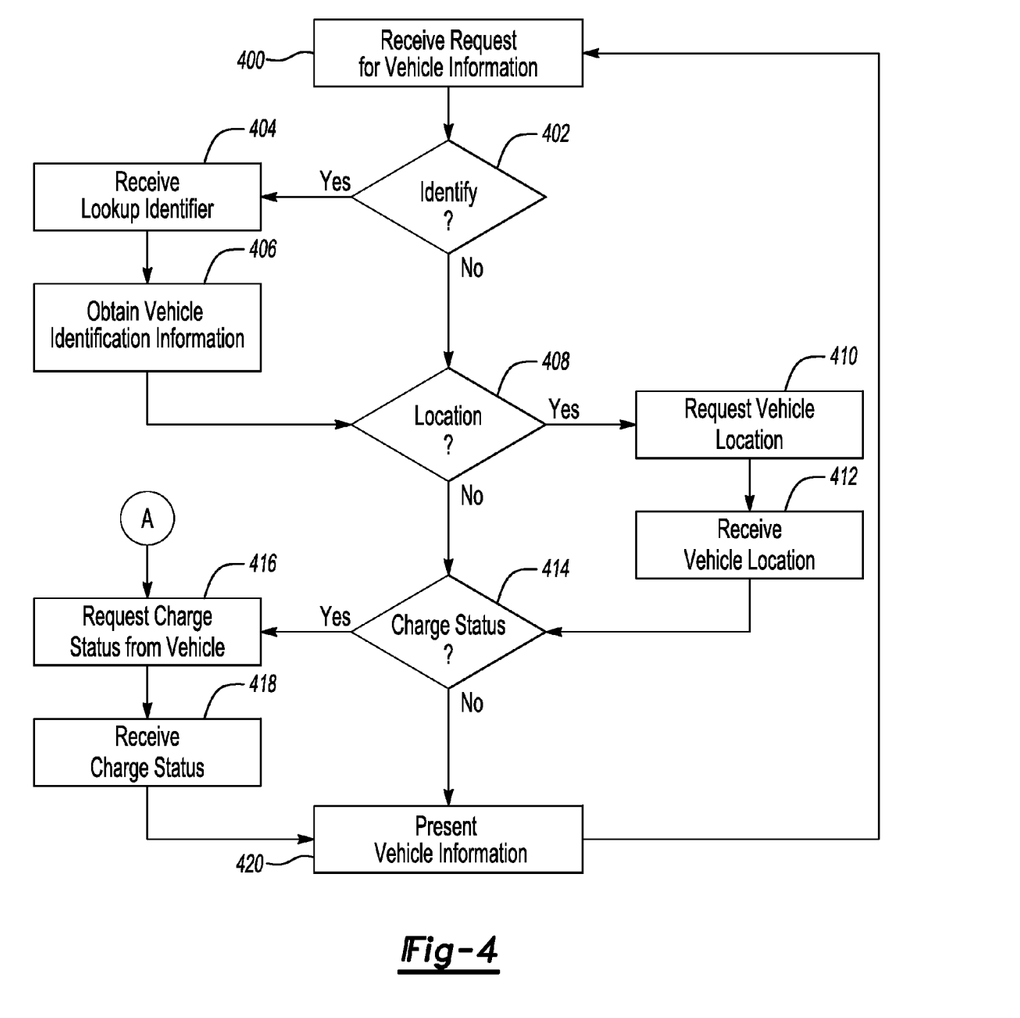
FIG. 4 illustrates a process for obtaining information about a vehicle such as, and without limitation, a vehicle name, location, and charge status.

FIG. 4 illustrates the process for communicating with the vehicle through the module 112 for obtaining select non-limiting examples of vehicle information. These specific operations of the module 112 illustrated in and described with respect to FIG. 4 are neither limiting nor exhaustive. Rather, these operations are provided as illustration of a non-limiting example of the overall operation of the module 112.

The one or more instruction(s) for information about the vehicle 31 may be received by or from the module 112 (block 400). One non-limiting example of instructions may be to receive vehicle identification information (block 402). The identification information may be a vehicle name, a vehicle number, and/or vehicle owner identification information. As a non-limiting example, the identification information may be "Mike's EV." In some embodiments, the identification information may be stored in memory such that the identification information for the vehicle is automatically presented.

In the case that identification information is requested, a lookup identifier may be received (block 404) by the application 112 from memory of the user device(s) 106 (or a remote device, if the application 112 is saved on the remote device). The look up identifier may be used to look up and obtain identification information from a database storing vehicle identification information (block 406). In some embodiments, the database may be a part of the centralized system. The look up identifier may be, for example (and without limitation), a vehicle identification number (VIN) or a user device identification number.

The vehicle identification information may be presented on the user device 106 display. In some embodiments, the information may be displayed at or near the top or bottom of the user device screen display (e.g., as a header or a footer).

Additionally or alternatively, a location of the vehicle 31 may be obtained by the module 112 (block 408). Based on GPS coordinates of the vehicle (block 410), the vehicle location may be determined and received by the module 112 (block 412). In some embodiments, the module 112 may use reverse geocoding to determine a vehicle's location. In other embodiments, the location of the vehicle may be determined from a database lookup using the GPS coordinates. Other methods may be used without departing from the scope of the inventions.

An additional or alternative information request may be a charge status of the vehicle battery (block 414). A charge status may be include, but is not limited to, the current charge of the battery, one or more notifications that the battery is not charging (e.g., the vehicle 31 is unplugged), notification(s) that the vehicle has reached a minimum critical charge point, and/or a charging status during a battery charge. The request for charge status may be transmitted from the application 112 to the VCS 1 (block 416) as described above. The battery charge information may be obtained from the battery 100 via the vehicle network 108 and transmitted for receipt at the user device 106 by the application 112 (block 418). This information exchange may occur through network 61. In alternative embodiments, the charge status information may be received from the EVSE 104. In some embodiments, the charge status may be automatically monitored and received at predetermined intervals of time (e.g., based on minutes, hours, days, or combinations and/or variations thereof).

In some embodiments, the charge status during a battery charge may include information on the length of time for fully charging the battery. The information may be updated in real-time or near real-time. Additionally or alternatively, the information may be automatically or manually updated periodically (e.g., based on units of time).

In some embodiments, the charge status may include a notification as to whether a user can reach a destination or complete roundtrip travel on the current charge of the battery. In this case, the user may input the distance of travel or the destination(s) (e.g., an address, POI, name, and the like).

Any or all of the information received by the module 112 may be presented at the user device 106 (block 420). The presentation of the vehicle information may include numbers, text, characters, graphics, or a combination of numbers, texts, characters, and graphics. As one non-limiting example, the vehicle identification information and location may be presented as text and the vehicle charge status may be represented by a battery and a charge level on the battery. The current charge status (whether or not during a battery charge event) may additionally or alternatively (and without limitation) be presented as a percentage or a numerical value. In some embodiments, the charge status information may be presented in an e-mail or a text message.

In some embodiments, the vehicle information may be updated and, therefore, the process for obtaining vehicle information may be repeated. The updates may be performed automatically on a periodic basis and/or manually in response to user input.

Figure 5:
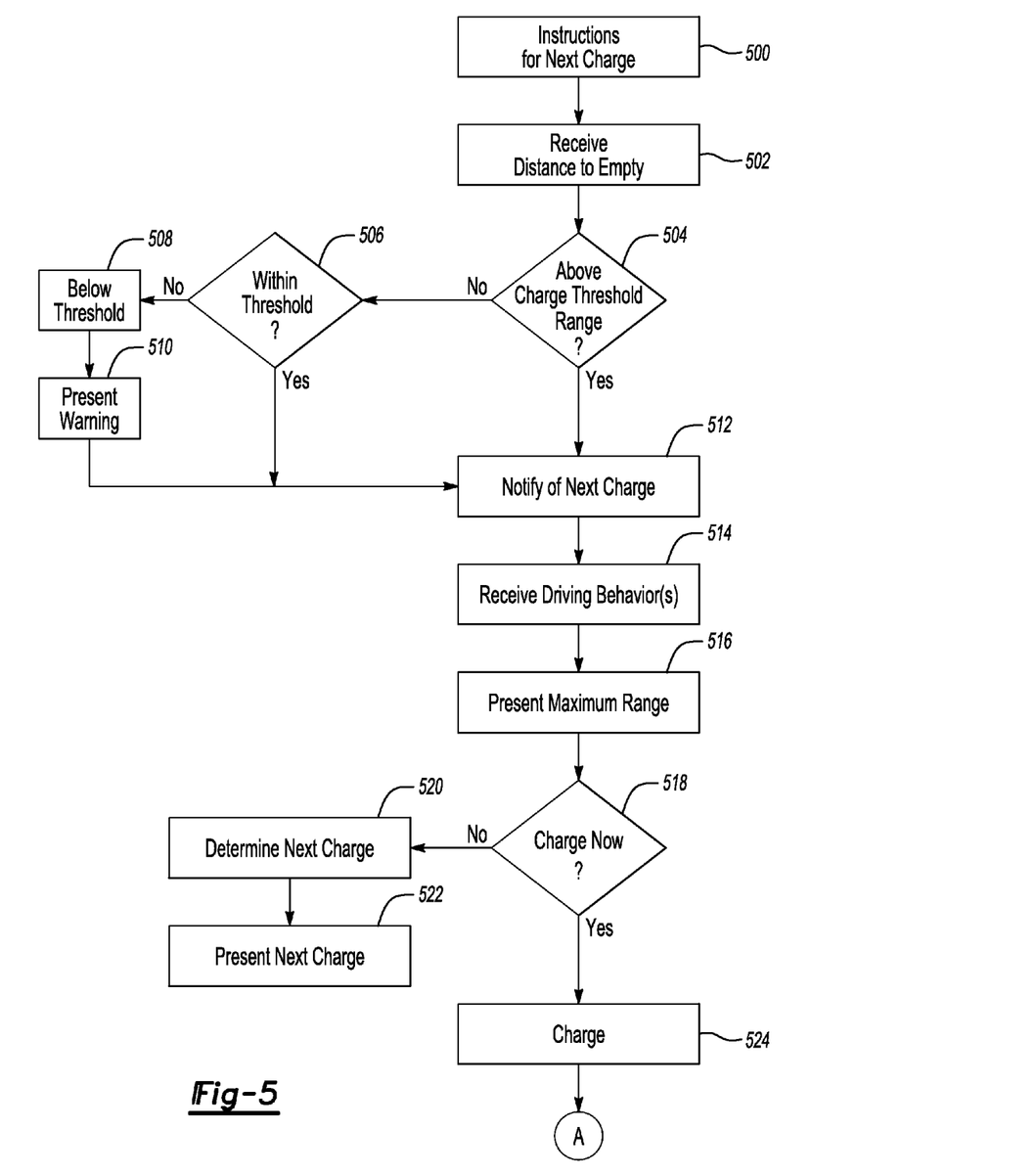
FIG. 5 illustrates a process for obtaining a vehicle charge status.

FIG. 5 illustrates a process for obtaining information on when the vehicle battery is next scheduled to be charged. This information may be obtained at the user device(s) 106 or, in some embodiments, at the VCS 1.

A charging schedule may be generated in which charging may occur automatically based on one or more occurrences. These occurrences may be defined as time-based occurrences (e.g., immediately, daily, weekly, on weekends, on particular days of the week, or combinations thereof) and/or charge-based occurrences. Non-limiting and non-exhaustive examples of charge-based occurrences are illustrated and described with respect to FIG. 5. While not illustrated in FIG. 5, it will be appreciated that the charge-based and time-based occurrences may be used together.

Instructions for the next charge may be commanded from the module 112 (block 500). A charge-based occurrence may be based on a "distance to empty" (DTE) of the vehicle's battery (block 502). A charge may be scheduled when the battery charge is actually or near empty. As a non-limiting example, a charge may be scheduled when the DTE may be at or near zero miles. Additionally or alternatively, the DTE may be defined by a distance threshold such that, for example, falling below the threshold, a charge may be scheduled.

In some embodiments, a charge may be scheduled when the DTE may be exceeded based on one or more driver attributes such as historical driving behaviors and/or a travel distance provided by the user. The historical driving behaviors may be stored in memory 7 of the vehicle 31 or on one or more servers. The travel distance provided by the user maybe input as an actual or estimated distance or as a destination (from which the distance may be extrapolated).

The DTE that may trigger a vehicle battery charge may be dynamic based on the historical driving patterns and/or travel distance. As a non-limiting example, based on the battery charge, if the DTE is 100 miles, but the travel distance is a total of 105 miles, the next charge may be scheduled to occur at the next possible charging opportunity. However, if the travel distance is 50 miles, a vehicle charge may be scheduled later. While the examples use mileage as a measure of distance, other measures may be used including, but not limited to, kilometers.

Using the DTE, a determination of charge status with respect to the distance threshold may be determined and a notification of the next charge provided. As a non-limiting example, if the charge in the battery is above the threshold (block 504), within the threshold (block 506), or below the threshold (block 508), a notification of the next charge may be presented (block 512). In some embodiments, when the charge is below a distance threshold, a warning may additionally be presented (block 510).

In some embodiments, an identifier may be presented of whether the charge is above, within, or below the distance threshold. The identifier may be a color, graphic, text, characters, numbers, or combinations of identifiers.

An additional notification may include a present maximum range of distance (block 516). In some embodiments, the maximum distance range may be included with a notification of the next charge (block 512).

In some embodiments, the maximum distance range may be based on the user's historical driving behavior (block 514). The driving behavior may also influence when to perform the next charge or charge status information. Of course, the illustration of driving behavior(s) used as part of the determination in FIG. 5 is for purposes of providing a comprehensive illustration and not to limit the various embodiments of the invention.

The historical driving behavior may be stored in vehicle memory 7 or on one or more servers. For example, and without limitation, information may be stored after every vehicle drive. As a non-limiting example, information about the vehicle drive may be stored at key-off. Each driver may be associated with an identifier, such as (and without limitation) a vehicle key identifier or a user identifier, which may be stored with the historical driving information. Using this association, the driver's driving behavior may be retrieved. Non-limiting examples of driving behavior may include distance driven (e.g., on a period basis such as daily, weekly, monthly, etc.) and driving habits (such as hard braking, terrain on which the vehicle is driven, speed, etc.).

Based on the charge status of the vehicle battery, the next charge may be determined (block 520). The next charge information may presented at the user device(s) 106 (block 522).

In some embodiments, the user may override a scheduled charge or immediately charge the vehicle notwithstanding a scheduled charge. As such, the user may elect to charge the vehicle immediately (block 518). In this case, the user may instruct, from the user device(s) 106, that a charge may commence (block 524). The instructions may be transmitted to the vehicle as described above. As represented by circle block A (and illustrated in FIG. 4), the charge status during the vehicle charge may be obtained and presented at the user device(s) 106.

Figure 6:
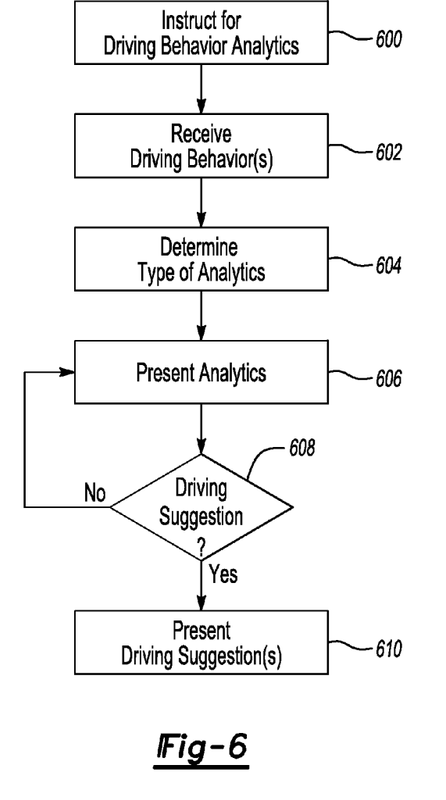
FIG. 6 illustrates a process for obtaining driver analytics.

Driver analytics may be provided at the user device(s) 106 relating to, for example, a driver's use of the vehicle. As non-limiting, non-exhaustive examples, analytic information may relate to fuel savings, cost savings, battery usage information (e.g., battery usage per mile and total amount used), carbon savings, driving style, and distance driven. The analytics may be measured and stored daily, weekly, monthly, yearly, and variations thereof. Additionally or alternatively, the analytics may be measured and stored each time the vehicle is driven.

In some embodiments, the driving analytics may also include a score of the driver's driving habits. These scores may relate to, for examples, a braking score and an overall driving score. In some embodiments, the analytics may also include information about each vehicle charge including, but not limited to, charge location, the amount filled, charging time, and cost.

The driver analytics may be analytics recorded/stored for a predetermined amount of time. For example, the analytics may be based on 30 days of driving. Of course, the period of time is non-limiting and provided for illustration.

The unit of measurement for the driver analytics may be the charge cycle. Each trip may be measured from when the vehicle is unplugged to when it is plugged in again. Each charge may be measured/tracked based on the vehicle being plugged-in. In some embodiments, each charge may be measured/tracked based on a complete charge.

Instructions for driving analytics may be issued from the module 112 (block 600). A driver may be identified based on a vehicle key identifier or a user identifier. This identifying information for each driver may be input and stored by the vehicle owner or other drivers of the vehicle.

The driving behaviors for the vehicle driver may be obtained (block 602) for the type of analytic(s) requested (block 604). In some embodiments, the type of analytic(s) request may be determined based on the instructions issued from the module (block 600). The analytic(s) may be presented at the user device(s) (block 606).

As one non-limiting example, analytics relating to the driving style of the driver with respect to battery charge may be provided. For example, the driving style may be characterized as "zippy" (e.g., using more battery charge) or "zen" (e.g., using less battery charge). The analytics may report that by driving more "zen," the driver may obtain greater mileage out of a battery charge as compared to driving "zippy."

In some embodiments, based on the recorded driving behaviors, the driving achievements by the driver may be presented to the driver. These achievements may be based on reaching particular goals, which may be defined by the OEM or the user. As a non-limiting example, the driver may be notified of the first time the driver reaches 75 miles on a single charge. In at least one embodiment, the driver may be rewarded by the OEM for the driving achievements and the driver may be notified of the reward.

In some embodiments, the analytics for a driver may be compared with analytics for other vehicle drivers. These other drivers maybe drivers of the same vehicle or drivers of other vehicles. The analytics of all drivers may be stored on a remote computing system (which, e.g., may be owned and operated by an OEM). Drivers may be compared to select other drivers (e.g., based on user selection of other drivers, a geographic area, type of vehicle, age, gender, and other like criteria) or all drivers.

In some embodiments, the analytics may relate to comparing the use of an electric vehicle to a non-electric (or gas powered) vehicle. The comparison may be made to gas-powered vehicles owned by the driver. In this case, the driver may provide the information on the non-electric vehicles owned (e.g., type of vehicle, mileage, automatic or manual transmission, and the like).

In some embodiments, driving suggestions may be provided at the user device(s) 106 based on a user request (e.g., through an audible and/or tactile input) (block 608). These suggestions for driving may relate to, for example, suggestions for optimizing use of the battery charge, environmentally friendly driving, and others. If requested, the driving suggestion(s) may be presented at the user device(s) 106 (block 610).

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A computer-implemented method for remotely obtaining information about an energy source of a vehicle, the method comprising:
   receiving at one or more computing devices remote from a vehicle information identifying one or more vehicles and one or more drivers of the one or more vehicles;
   transmitting instructions from the one or more remote computing devices requesting information from the one or more identified vehicles about a status of an energy source for the identified vehicle;

receiving the status information at the one or more remote computing devices;

based on the energy source status information and the information identifying the one or more drivers, calculating at the one or more remote computing devices a vehicle energy source status with respect to one or more attributes of the vehicle drivers; and displaying the vehicle energy source status at the one or more devices.

2. The computer-implemented method of claim 1 wherein the energy source is one or more batteries.

3. The computer-implemented method of claim 1 wherein the identifying information is based on one or more vehicle keys.

4. The computer-implemented method of claim 1 wherein the identifying information is input by a user.

5. The computer-implemented method of claim 1 further comprising:

receiving a vehicle charging schedule for automatic charging of the vehicle;

commanding vehicle charging from the one or more remote computing devices based on the vehicle charging schedule; and based on the commanding, transmitting one or more charging instructions to the vehicle.

6. The computer-implemented method of claim 5 wherein the schedule is a time-based schedule.

7. The computer-implemented method of claim 5 wherein the schedule is a schedule based on a charge of the vehicle.

8. The computer-implemented method of claim 1 wherein the one or more attributes is one or more driving behaviors of the one or more identified drivers including at least one of driving style, speed, terrain driven, and distance.

9. The computer-implemented method of claim 1, wherein there is at least a first vehicle driver of the identified vehicle and a second vehicle driver of the identified vehicle, the method further comprising:

performing a comparison of information relating to the use of the identified vehicle by the first vehicle driver and the second vehicle driver; and presenting the comparison on the one or more remote devices.

10. A system comprising:

at least one device configured to:

receive information identifying a vehicle and vehicle drivers;

receive information for determining the vehicle energy source status;

determine an energy source status with respect to a driver attribute based on the status information and the driver information; and display the vehicle energy source status.

11. The system of claim 10 wherein the at least one device is at least one of a nomadic device, a personal computer, or a server computing system.

12. The system of claim 10 wherein the at least one device is further configured to receive a software application for commanding one or more operations performed at the vehicle, wherein at least one operation includes receiving the information for determining the vehicle energy source status.

13. The system of claim 12 wherein at least one other instruction includes door lock and unlock, HVAC control, vehicle start, radio system control, and window control.

14. The system of claim 10 wherein the at least one device is further configured to receive one or more commands for immediate charging.

* * * * *